US009332053B2

(12) United States Patent
Sheer

(10) Patent No.: US 9,332,053 B2
(45) Date of Patent: May 3, 2016

(54) METHODS, SYSTEMS, AND COMPUTER READABLE MEDIA FOR LOAD BALANCING STREAM CONTROL TRANSMISSION PROTOCOL (SCTP) MESSAGES

(71) Applicant: Tekelec, Inc., Morrisville, NC (US)

(72) Inventor: Paul Sheer, Dallas, TX (US)

(73) Assignee: Tekelec, Inc., Morrisville, NC (US)

( * ) Notice: Subject to any disclaimer, the term of this patent is extended or adjusted under 35 U.S.C. 154(b) by 395 days.

(21) Appl. No.: 13/910,091

(22) Filed: Jun. 4, 2013

(65) Prior Publication Data

US 2013/0339540 A1    Dec. 19, 2013

Related U.S. Application Data

(60) Provisional application No. 61/660,512, filed on Jun. 15, 2012.

(51) Int. Cl.
| | | |
|---|---|---|
| G06F 15/16 | (2006.01) | |
| G06F 11/00 | (2006.01) | |
| H04L 29/06 | (2006.01) | |
| H04L 29/08 | (2006.01) | |

(52) U.S. Cl.
CPC .......... *H04L 65/608* (2013.01); *H04L 65/1063* (2013.01); *H04L 65/80* (2013.01); *H04L 67/1004* (2013.01); *H04L 67/1023* (2013.01)

(58) Field of Classification Search
CPC . G06F 21/44; G06F 67/1027; G06F 67/1036; G06F 67/1004; H04L 65/1063; H04L 65/608; H04L 67/1004; H04L 67/1023
USPC ................. 709/203, 226, 219, 229, 235, 232; 370/229
See application file for complete search history.

(56) References Cited

U.S. PATENT DOCUMENTS

| | | | | |
|---|---|---|---|---|
| 7,970,402 | B2 * | 6/2011 | Wu | H04L 29/12301 370/329 |
| 8,549,146 | B2 * | 10/2013 | Stanisic | G06F 9/505 709/226 |
| 8,687,622 | B2 * | 4/2014 | McNair | H04L 43/026 370/231 |
| 8,737,210 | B2 * | 5/2014 | Tremblay | H04L 67/1027 370/230 |
| 8,948,016 | B2 * | 2/2015 | Kruglick | H04L 43/026 370/229 |
| 8,996,614 | B2 * | 3/2015 | Choudhary | H04L 65/4076 709/203 |
| 2008/0282254 | A1 * | 11/2008 | Blander | H04L 67/1029 718/105 |
| 2011/0185065 | A1 * | 7/2011 | Stanisic | G06F 9/505 709/226 |
| 2012/0230187 | A1 * | 9/2012 | Tremblay | H04L 67/1023 370/230 |
| 2012/0233240 | A1 * | 9/2012 | Chatilla | H04L 67/1023 709/203 |
| 2013/0117847 | A1 * | 5/2013 | Friedman | G06F 21/00 726/22 |

OTHER PUBLICATIONS

Stewart, "Stream Control Transmission Protocol," RFC 4960, pp. 1-153 (Sep. 2007).

\* cited by examiner

*Primary Examiner* — Kristie Shingles
(74) *Attorney, Agent, or Firm* — Jenkins, Wilson, Taylor & Hunt, P.A.

(57) ABSTRACT

According to one aspect, the subject matter described herein includes a method for load balancing SCTP messages. The method includes receiving an SCTP message containing an address, a port identifier, and a verification tag. The method includes determining, using the verification tag, an associated application server from a plurality of application servers. The method includes sending the SCTP message to the application server for processing.

19 Claims, 4 Drawing Sheets

METHODS, SYSTEMS, AND COMPUTER READABLE MEDIA FOR LOAD BALANCING STREAM CONTROL TRANSMISSION PROTOCOL (SCTP) MESSAGES

PRIORITY CLAIM

This application claims the benefit of U.S. Provisional Patent Application Ser. No. 61/660,512, filed Jun. 15, 2012; the disclosure of which is incorporated herein by reference in its entirety.

TECHNICAL FIELD

The subject matter described herein relates to processing communications. More specifically, the subject matter relates to methods, systems, and computer readable media for load balancing stream control transmission protocol (SCTP) messages.

BACKGROUND

At present, problems exist with load balancing messages that may be associated with multiple sources. Namely, there are difficulties associated with the identification and correlation of subsequently received SCTP messages that do not have the same source address as a preceding SCTP message. As a consequence, SCTP messages received at a routing node may not be forwarded to the same network service node (e.g., an application server) assigned to process an existing SCTP message stream (e.g., one or more related messages).

Accordingly, a need exists for improved methods, systems, and computer readable media for load balancing SCTP messages.

SUMMARY

According to one aspect, the subject matter described herein includes a method for load balancing SCTP messages. The method includes receiving an SCTP message containing an address, a port identifier, and a verification tag. The method includes determining, using the verification tag, an associated application server from a plurality of application servers. The method includes sending the SCTP message to the application server for processing.

According to another aspect, the subject matter described herein includes a system for routing Diameter messages. The system includes a load balancing module including at least one physical processor. The load balancing module is configured to receive an SCTP message containing an address, a port identifier, and a verification tag, to determine, using the verification tag, an associated application server from a plurality of application servers, and to send the SCTP message to the application server for processing.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
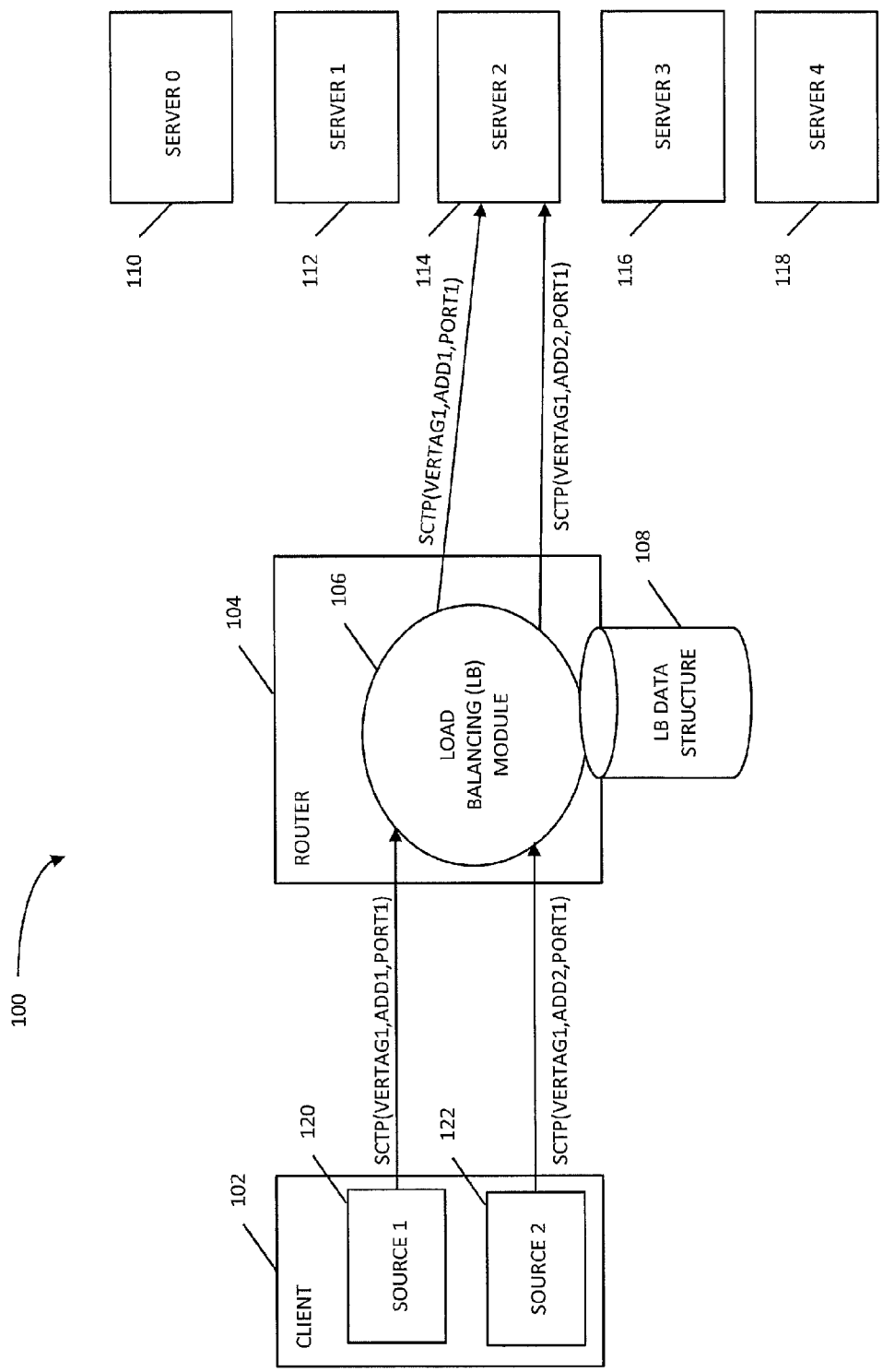
FIG. 1 is a diagram illustrating an exemplary load balancing module according to an embodiment of the subject matter described herein.

FIG. 1 is a diagram illustrating an exemplary load balancing (LB) module 106 according to an embodiment of the subject matter described herein. Referring to FIG. 1, an exemplary network 100 may include a client 102, a router 104, and application servers 110-118. A client 102 may be a node or any suitable entity for sending various messages, such as SCTP or TCP messages. For example, client 102 may be a device or computing platform associated with two or more communications interfaces. In another example, client 102 may include two or more devices or computing platforms. Client 102 may be associated with one or more source identifiers, such as Internet protocol (IP) addresses and/or other originating identifiers.

Source 1 120 and source 2 122 represent any suitable entities (e.g., a network interface cards (NICs)) for providing messages from client 102. In some embodiments, each source may be associated with a unique identifier and/or may be used for redundancy purposes. For example, source 1 120 may be associated with an address "ADD1" and used as a primary source and source 2 120 may be a network interface card (NIC) associated with an address "ADD2" and used as a backup source (e.g., in case source 1 120 becomes inoperable). During an SCTP transaction, the client may send messages to a second node from both source 1 120 and source 2 122.

Router 104 may be any suitable entity for receiving and processing messages from client 102 and/or other nodes. For example, router 104 may be a Diameter signaling router, a session initiation protocol (SIP) router, an Internet protocol (IP) gateway, or other routing node. Router 104 may include multiple processors and/or modules for performing various functions. Router 104 may include LB module 106 and may include or access an LB data structure 108.

LB module 106 may be any suitable entity (e.g., software executing on a processor or field programmable gate array (FPGA)), for load balancing (e.g., load sharing) messages.

For example, LB module 106 may be configured to receive receiving an SCTP message (e.g., including an encapsulating packet frame) and select, using information associated with the SCTP message (e.g., including an encapsulating packet frame), an appropriate application server from a plurality of application servers 110-118. LB module 106 may be configured to send related messages (e.g., messages of a same transaction or stream) to the same server for processing. For example, LB module 106 may use data (e.g., a source address and a port identifier, a verification tag and a port identifier, and/or other characteristics) contained in a message to determine whether the message is associated with any preceding messages.

LB module 106 may also use data to select an appropriate application server for processing a particular message, transaction, or stream (e.g., one or more related messages or packets). For example, a SCTP message may be encapsulated in a packet frame (e.g., an IPSec frame). In this example, LB module 106 may use data contained in the SCTP message or the encapsulating packet frame. Exemplary data usable by LB module 106 in selecting an appropriate application server may include a source address, a port identifier, a verification tag, and/or other data in an SCTP message or encapsulating packet frame. LB module 106 may process data using a hashing function or a cryptographic digest to produce a hash value. The hash value may be processed using a modulo operation. In some embodiments, LB module 106 may select an application server by using the hash value to map the data space to the application server range in a many-to-one relationship. For example, a hash value may be divided by the number of available application servers 110-118 and using the remainder to indicate one of the application servers 110-118 (e.g., 1921684288 modulo 5=3).

In some embodiments, LB module 106 may select an application server using criteria based on data such as application server loading information or metrics. Exemplary loading information or metrics may include or relate to resource consumption, traffic rates, availability, reliability, or performance. For example, LB module 106 may obtain periodic or aperiodic (e.g., dynamic) updates (e.g., via requests or subscriptions to a network manager or application servers 110-118) concerning one or more application servers 110-118. The updates may include information about resource consumption (e.g., utilization), network conditions, traffic rates, availability, reliability, performance, and/or other information related to application servers 110-118. Using the obtained information, LB module 106 may select an application server that is available and capable of processing messages. In another example, LB module 106 may maintain or keep track of historical selection information. The historical selection information may include information on which application server was most recently or least recently selected and/or a number of messages that has been sent to each available application server in a given time period. Using this information, LB module 106 may select an application server that is least utilized or lightly loaded.

In some embodiments, selecting an application server may include determining one or more available (e.g., usable) application servers 100-118 based on loading information, metrics, or historical selection information and then using a hashing-based selection algorithm or another selection algorithm to select an application server from the determined available application servers 100-118.

It will be appreciated that various selection algorithms may be used in addition to or in lieu of the above described methods for selecting an application server. Exemplary selection algorithms may include a round-robin algorithm, a resource-based algorithm, a load-based algorithm, or a combination of two or more selection algorithms.

LB module 106 may include or access LB data structure 108. LB data structure 108 may be any suitable entity (e.g., a computer readable medium) for storing information associated with load balancing messages. For example, LB data structure 108 may include associations between message-related data (e.g., data obtained from one or more related SCTP messages or encapsulating packet frames) and application servers 110-118. In some embodiments, LB data structure 108 may be co-located at LB module 106 or router 104. In some embodiments, LB data structure 108 may be located at a node distinct or separate from router 104.

In some embodiments, a verification tag, a source identifier, and/or information that may be common to at least some messages in a particular transaction or stream may be stored, e.g., in a LB data structure 108. Using this stored information, LB module 106 may identify a previously selected application server to receive and process messages associated with the particular transaction or stream. For example, LB data structure 108 may be queried to determine if an SCTP message of a particular transaction or stream should be sent to a particular server for processing.

Application servers 110-118 may be any suitable entities for processing messages. For example, application servers 110-118 may include a web server, a SIP server, a Diameter server, or any other device or computing platform for processing a message. Application servers 110-118 may use and store state information related to one or more messages. Application servers 110-118 may receive messages from router 104 and/or other nodes in network 100. Application servers 110-118 may also send response messages to origination nodes or router 104.

As depicted in FIG. 1, an SCTP message from source 1 120 may be sent to router 104. At router 104, LB module 106 may inspect the SCTP message and determine, by querying LB data structure 108 using a verification tag and/or other information contained in the SCTP message or an encapsulating packet frame, that the SCTP message should be processed by server 2 114. After receiving and processing the SCTP message, server 2 114 may send a response message to a source 1 120.

Figure 2:
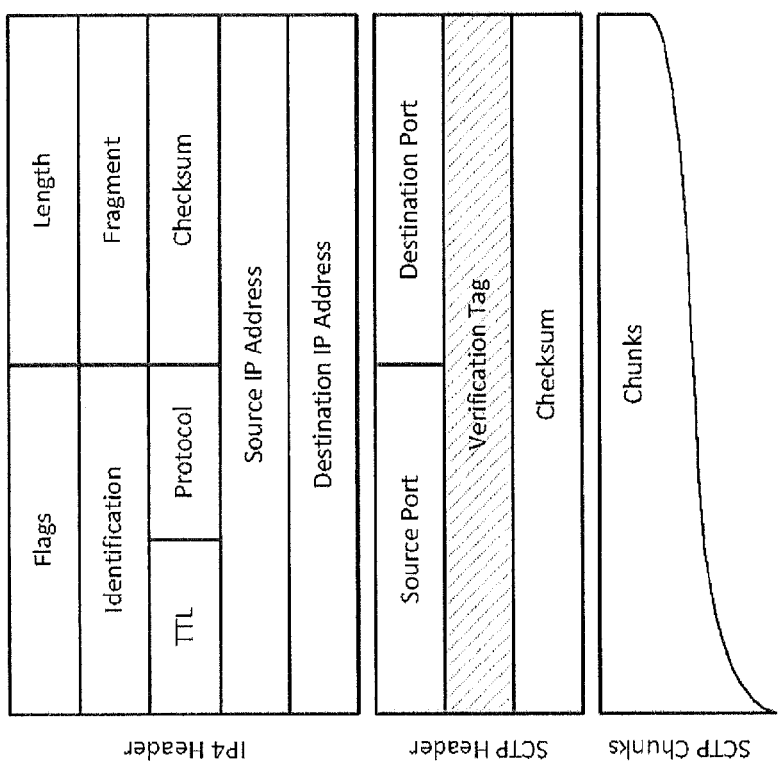
FIG. 2 is a diagram illustrating portions of an exemplary SCTP message.

FIG. 2 is a diagram illustrating portions of an exemplary SCTP message. SCTP is a reliable, message-oriented transport layer protocol defined by RFC 4960, the disclosure of which is incorporated herein in its entirety. SCTP include various features. One such feature is multi-homing support. Multi-homing support allows packets from various sources to be associated with the same stream or transaction. That is, a client may use multiple addresses to transmit data. Multi-homing support may be especially useful in redundancy situations, where backup or secondary transmission paths may be used. SCTP may be used to provide transport Public Switched Telephone Network (PSTN) signaling messages over an IP network and/or for other applications.

SCTP messages typically include one or more header and one or more chunks. As depicted in FIG. 2, the exemplary SCTP message may include an Internet protocol (IP) header, an SCTP header, and one or more SCTP chunks (e.g., groups of bytes). The IP header may include various parameters or field values, such as a source IP address, a destination IP address, a checksum, a time to live (TTL) value, and other information. The SCTP header may include a source port identifier, a destination, a verification tag, and a checksum. The verification tag may be a 32-bit unsigned integer that is randomly generated. The verification tag may be used as an authentication or security parameter, such as to verify that the SCTP packet belongs to a current stream and is not an old or stale packet from a previous stream. In some embodiments, the verification tag, one or more addresses, and/or one or more port identifiers may be used by LB module 106 in determining or selecting an appropriate server for processing related SCTP messages.

The exemplary SCTP message may also include chunks containing control information and data. For example, one chunk may include control information, such as setup information and another chunk may include data, such as media content.

Figure 3:
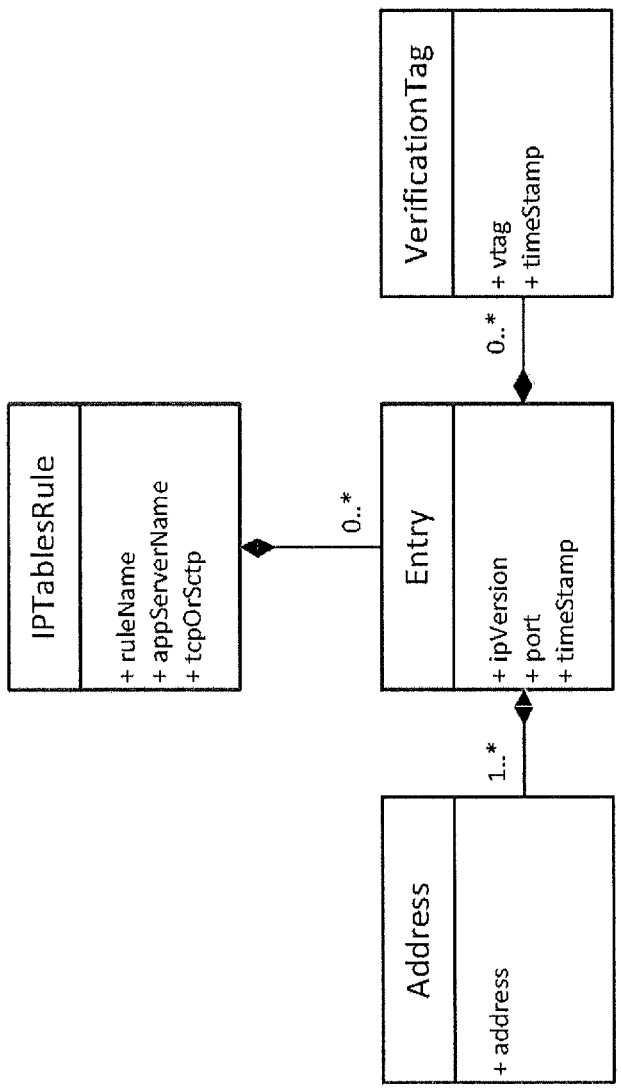
FIG. 3 is a diagram illustrating an exemplary load balancing data structure relationship according to an embodiment of the subject matter described herein.

FIG. 3 is a diagram illustrating an exemplary load balancing data structure relationship according to an embodiment of the subject matter described herein. Referring to FIG. 3, each box may represent a logical entity (e.g., a rule, an address, an entry, or a verification tag) associated with load balancing messages. Each entity may include data. The various entities and their data may be stored in one or more tables, e.g., in LB data structure 108.

An IP tables rule entity may represent processing related information for particular streams. For example, an IP tables rule may be associated with numerous entry entries. The rule entity may include a rule name, an application server for performing the rule (e.g., processing the message), and an indication whether the rule is for a TCP message or an SCTP message.

An entry entity represents a data structure usable to identify a stream (e.g., related messages). The entry entity may include data obtained from a received message, such as an IP version value, a port identifier, and a timestamp. For example, an IP version may be obtained from the IP header of an SCTP message and a port identifier may be obtained from an SCTP header of the SCTP message. A timestamp may also be included in the SCTP message or may be obtained from a separate source, such as an internal clock of router 104. In some embodiments, timestamps may be used to delete older entries. For example, LB module 106 may be configured to delete or remove entries from LB data structure 108 if timestamps indicate the entries are older than 1 hour.

An entry entity may also be associated with or identified by one or more entities, such as an address entity and a verification tag entity. An address entity may represent an address associated with a particular stream and/or entry entity. For example, an address entity may be a source IP address obtained from an SCTP message. In some embodiments, a source IP address and a source port identifier may uniquely identify an SCTP or TCP message stream.

A verification tag entity may represent a verification tag associated with a particular stream and/or entry entity. For example, a verification tag entity may be a verification tag obtained from an SCTP message. In some embodiments, a verification tag and a source port identifier may be used to uniquely identify an SCTP message stream. In some embodiments, some entries may not be associated with a verification tag entity, such as entities associated with TCP streams.

As stated above, entities are logical constructs and are used for illustrative purposes. In some embodiments, LB data structure 108 may include an entry containing information associated with one or more entities described above and/or different or additional information.

Figure 4:
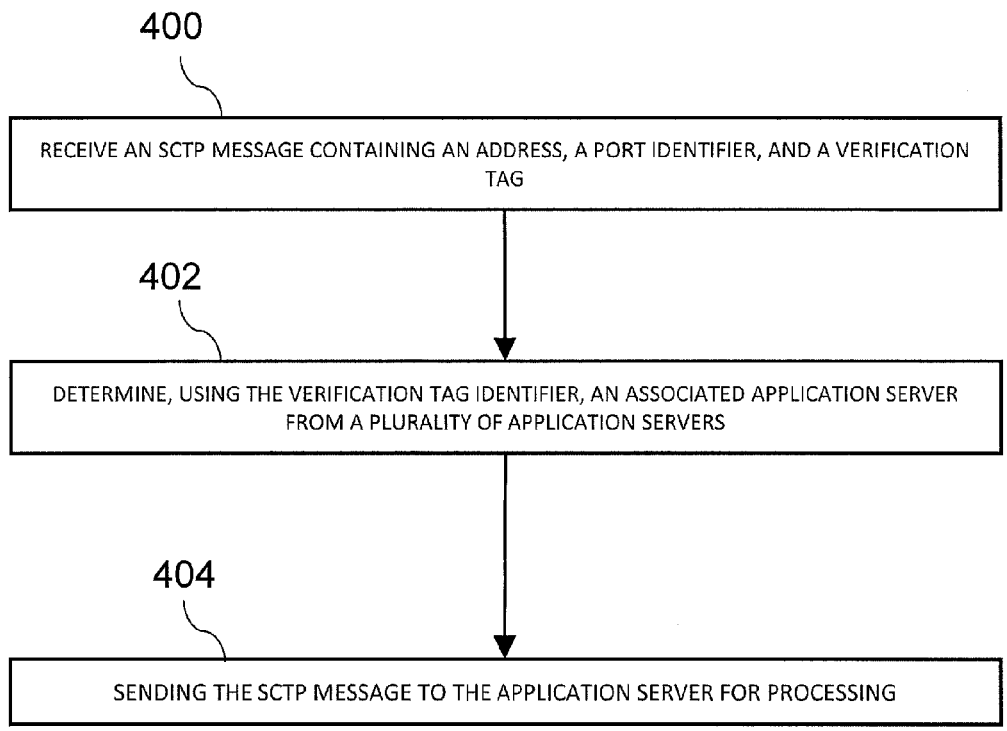
FIG. 4 is a diagram illustrating an exemplary process for load balancing SCTP messages according to an embodiment of the subject matter described herein.

FIG. 4 is a diagram illustrating an exemplary process for load balancing SCTP messages according to an embodiment of the subject matter described herein. In some embodiments, the exemplary process, or portions thereof, may be performed by or at router 104 and/or LB module 106.

At step 400, an SCTP message may be received. The SCTP message may contain an address, a port identifier, and a verification tag. In some embodiments, the address may include a source address or a destination address and the port identifier may include a source port identifier or a destination port identifier.

In some embodiments, the SCTP message may be an initiation message containing a plurality of addresses. For example, an INIT packet of an SCTP handshaking process may include multiple addresses that a client can use during a transaction or stream. In some embodiments, LB module 106 may be configured to process the INIT packet and store the multiple addresses in LB data structure 108. For example, LB module 106 may receive and process an INIT packet, select a server for processing the new SCTP stream, and generate a new entry in LB data structure 108 that includes all addresses associated with the new stream. In this example, when a message is received during the stream and the message includes a address disclosed in the INIT packet, a search of LB data structure 108 using the address will result in a matching entry.

In some embodiments, LB module 106 may also monitor each message received at router 104 to determine whether additional address are associated with a stream and/or determine whether any additional address should be associated with an appropriate entry in LB data structure 108.

At step 402, an associated application server from a plurality of application servers 110-118 may be determined using the verification tag. For example, after receiving an SCTP message, LB data structure 108 may be searched using a source IP address and a source port identifier. If no entry that matches the source IP address and the source port identifier is found, LB data structure 108 may be searched using a verification tag and, optionally, other information, such as a source port identifier. If an entry that matches is found, the entry may identify an appropriate application server for processing the SCTP message.

In some embodiments, determining, using the verification tag, an application server of a plurality of application servers 110-118 includes determining whether the address and the port identifier are associated with an entry in LB data structure 108, in response to determining that the address and the port identifier is not associated with an entry in LB data structure 108, determining whether the verification tag and the port identifier are associated with an entry in LB data structure 108, in response to determining that the verification tag and the port identifier are associated with an entry in LB data structure 108, modifying the entry so that the address and the port identifier are associated with the entry, and identifying the application server using the entry.

In some embodiments, LB module 106 may generate and store a new entry for new SCTP streams. For example, in response to determining that a verification tag and a port identifier is not associated with an entry in LB data structure 108, LB module 106 may be configured to select an appropriate application server based on or using information associated with the SCTP message or application server loading information or metrics and to store a new entry in LB data structure 108, wherein the new entry associates the SCTP message and the appropriate application server.

In some embodiments, selecting an appropriate application server based on information associated with the SCTP message includes computing, using at least one of the address, the verification tag, and the port identifier, a hash value usable in selecting the appropriate application server.

In some embodiments, information associated with the SCTP message includes a hash value usable in selecting the appropriate application server, wherein the hash value is computed using at least one of the address, the verification tag, the port identifier, or other data in the SCTP message or an encapsulating packet frame.

In some embodiments, application server loading information or metrics includes information related to resource consumption, traffic rates, availability, reliability, or performance.

In some embodiments, storing a new entry in LB data structure 108 includes associating the verification tag and the port identifier with the new entry.

In some embodiments, storing a new entry in LB data structure 108 includes associating the address and the port identifier with the new entry.

In some embodiments, determining whether the address and the port identifier are associated with an entry in LB data structure 108 includes includes performing, using the address and the port identifier as a key, a lookup in LB data structure 108 to identify a corresponding entry, wherein the corresponding entry indicates the application server for processing the SCTP message.

In some embodiments, determining whether the verification tag and the port identifier are associated with an entry in LB data structure 108 includes performing, using the verification tag and the port identifier as a key, a lookup in the load balancing data structure to identify a corresponding entry, wherein the corresponding entry indicates the application server for processing the SCTP message.

At step 404, the SCTP message may be sent to the application server for processing. For example, a received SCTP message of a particular SCTP stream may be sent to an application server assigned to process other messages of the SCTP stream.

While the above description has discussed load balancing SCTP messages, it will be appreciate that the present subject matter may be used to load balancing messages associated with various other protocols that support multi-homing clients (e.g., a client having multiple associated addresses) or support verification tags, stream identifiers, or similar information.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for load balancing stream control transmission protocol (SCTP) messages, the method comprising:
   receiving an SCTP message containing an address, a port identifier, and a verification tag;
   determining, using the verification tag, an associated application server from a plurality of application servers, wherein determining, using the verification tag, the associated application server from the plurality of application servers includes determining whether the address and the port identifier are associated with an entry in a load balancing data structure, in response to determining that the address and the port identifier are not associated with an entry in the load balancing data structure, determining whether the verification tag and the port identifier are associated with an entry in the load balancing data structure, in response to determining that the verification tag and the port identifier are associated with an entry in the load balancing data structure, modifying the entry so that the address and the port identifier are associated with the entry, and identifying the application server using the entry; and
   sending the SCTP message to the application server for processing.

2. The method of claim 1 comprising:
   in response to determining that the verification tag and the port identifier is not associated with an entry in the load balancing data structure, selecting an appropriate application server based on information associated with the SCTP message; and
   storing a new entry in the load balancing data structure, wherein the new entry associates the SCTP message and the appropriate application server.

3. The method of claim 2 wherein selecting an appropriate application server based on information associated with the SCTP message includes computing, using at least one of the address, the verification tag, and the port identifier, a hash value usable in selecting the appropriate application server.

4. The method of claim 2 wherein storing a new entry in the load balancing data structure includes associating the verification tag and the port identifier with the new entry.

5. The method of claim 2 wherein storing a new entry in the load balancing data structure includes associating the address and the port identifier with the new entry.

6. The method of claim 1 wherein determining whether the address and the port identifier are associated with an entry in the load balancing data structure includes performing, using the address and the port identifier as a key, a lookup in the load balancing data structure to identify a corresponding entry, wherein the corresponding entry indicates the application server for processing the SCTP message.

7. The method of claim 1 wherein determining whether the verification tag and the port identifier are associated with an entry in the load balancing data structure includes performing, using the verification tag and the port identifier as a key, a lookup in the load balancing data structure to identify a corresponding entry, wherein the corresponding entry indicates the application server for processing the SCTP message.

8. The method of claim 1 wherein the address include a source address or a destination address and wherein the port identifier includes a source port identifier or a destination port identifier.

9. The method of claim 1 wherein the SCTP message is an initiation message containing a plurality of addresses and wherein the plurality of addresses are associated with a new entry in the load balancing data structure.

10. A system for load balancing stream control transmission protocol (SCTP) messages, the system comprising:
    a load balancing module including at least one physical processor, the load balancing module is configured to:
    receive an SCTP message containing an address, a port identifier, and a verification tag;
    determine, using the verification tag, an associated application server from a plurality of application servers, wherein determining, using the verification tag, the associated application server from the plurality of application servers includes determining whether the address and the port identifier are associated with an entry in a load balancing data structure, in response to determining that the address and the port identifier are not associated with an entry in the load balancing data structure, determining whether the verification tag and the port identifier are associated with an entry in the load balancing data structure, in response to determining that the verification tag and the port identifier are associated with an entry in the load balancing data structure, modifying the entry so that the address and the port identifier are associated with the entry, and identifying the application server using the entry; and send the SCTP message to the application server for processing.

11. The system of claim 10 wherein the load balancing module is configured to in response to determining that the verification tag and the port identifier is not associated with an entry in the load balancing data structure, select an appropriate application server based on information associated with the SCTP message and store a new entry in the load balancing data structure, wherein the new entry associates the SCTP message and the appropriate application server.

12. The system of claim 11 wherein the load balancing module is configured to select an appropriate application server based on information associated with the SCTP message by computing, using at least one of the address, the verification tag, and the port identifier, a hash value usable in selecting the appropriate application server.

13. The system of claim 11 wherein the load balancing module is configured to associate the verification tag and the port identifier with the new entry.

14. The system of claim 11 wherein the load balancing module is configured to associate the address and the port identifier with the new entry.

15. The system of claim 10 wherein the load balancing module is configured to determine whether the address and the port identifier are associated with an entry in the load balancing data structure by performing, using the address and the port identifier as a key, a lookup in the load balancing data structure to identify a corresponding entry, wherein the corresponding entry indicates an application server for processing the SCTP message.

16. The system of claim 10 wherein the load balancing module is configured to determine whether the verification tag and the port identifier are associated with an entry in the load balancing data structure by performing, using the verification tag and the port identifier as a key, a lookup in the load balancing data structure to identify a corresponding entry, wherein the corresponding entry indicates the application server for processing the SCTP message.

17. The system of claim 10 wherein the address include a source address or a destination address and wherein the port identifier includes a source port identifier or a destination port identifier.

18. The system of claim 10 wherein the SCTP message is an initiation message containing a plurality of addresses and wherein the plurality of addresses are associated with a new entry in the load balancing data structure.

19. A non-transitory computer readable medium comprising computer executable instructions that when executed by a processor of a computer control the computer to perform steps comprising:

receiving an SCTP message containing an address, a port identifier, and a verification tag;

determining, using the verification tag, an associated application server from a plurality of application servers, wherein determining, using the verification tag, the associated application server from the plurality of application servers includes determining whether the address and the port identifier are associated with an entry in a load balancing data structure, in response to determining that the address and the port identifier are not associated with an entry in the load balancing data structure, determining whether the verification tag and the port identifier are associated with an entry in the load balancing data structure, in response to determining that the verification tag and the port identifier are associated with an entry in the load balancing data structure, modifying the entry so that the address and the port identifier are associated with the entry, and identifying the application server using the entry; and sending the SCTP message to the application server for processing.

* * * * *